Patented June 22, 1954

2,681,936

UNITED STATES PATENT OFFICE 2,681,936

SODIUM CARBONATE IN CUMENE OXIDATION

George G. Joris, Madison, N. J., assignor to Allied Chemical & Dye Corporation, New York, N. Y., a corporation of New York No Drawing. Application August 3, 1950, Serial No. 177,549

5 Claims. (Cl. 260—610)

This invention relates to liquid phase oxidation of cumene by elemental oxygen, particularly oxygen of air, to produce cumene hydroperoxide as major product and is a continuation-in-part of my application Serial No. 105,649 filed July 19, 1949, now abandoned.

At temperatures above about 90° C., oxidations of cumene in liquid phase by elemental oxygen in absence of additive and in presence of basic additive such as calcium hydroxide form acetophenone and/or dimethyl phenyl carbinol as the major products. Typical processes are disclosed by Stephens in Journal of the American Chemical Society, volume 48, pages 2920-2922 (1926) using 102°-104° C.; and by Emerson and Heyd in U. S. Patent 2,447,400 using temperatures suitably from 100° C. to the boiling point of the hydrocarbon. Below about 90° C., cumene has been oxidized in liquid phase by elemental oxygen to cumene hydroperoxide; but in such operations long induction peiods, slow reaction, and undesirably low yields are often encountered.

By the present invention a specific additive is provided which when present during oxidation of cumene in liquid phase by elemental oxygen at temperatures from above 90° C. to about 130° C. transforms this oxidation to produce cumene hydroperoxide as major product. Use of the temperatures and additive of this invention together result in shortening or eliminating induction periods encountered at lower temperatures, maintaining or improving yields obtained by other processes, and increasing production rates of cumene hydroperoxide over those obtained at lower temperatures and/or without an additive. Other objects and advantages will appear hereinafter.

In accordance with my invention, I provide and maintain solid sodium carbonate in contact with cumene which is being oxidized at temperatures from above 90° C. to about 130° C. in liquid phase by air (or by elemental oxygen in other form), and recover cumene hydroperoxide as major product. The sodium carbonate is, for example, in finely divided form, maintained in suspension in the reaction mixture.

The quantities of powdered sodium carbonate which will be used under conditions when induction periods are not a serious factor are very small, e. g. 0.05 gram per 100 cc. of unreacted cumene, and less. Larger amounts, for example 2-25 grams per 100 cc. of unreacted cumene do no harm and tend to shorten any induction periods appearing in the oxidation. Accordingly, and especially at lower temperatures where induction periods are more evident, quantities of sodium carbonate such as 0.25-5 grams per 100 cc. of unreacted cumene are suitable.

The activity of sodium carbonate in endowing cumene with high oxidizability to cumene hydroperoxide is not fully understood. It may be noted that other materials of alkaline reaction do not necessarily impart high oxidizability of cumene samples to cumene hydroperoxide; and other materials which are useful additives for improving cumene oxidation to cumene hydroperoxide at temperatures below 90° C. are often unsatisfactory with respect to promoting cumene hydroperoxide formation as against acetophenone and dimethyl phenyl carbinol formation at temperatures above 90° C.

The following examples illustrate my invention, but are not intended in a limiting sense.

*Example 1.*—A sample of commercial cumene was shaken with aqueous sodium hydroxide solution, separated, and passed to a vessel equipped with air inlet dispersing the air in fine bubbles, thermometer, and reflux condenser. Two grams, per 100 cc. of reaction mixture, of commercial soda ash (anhydrous sodium carbonate) was maintained in suspension in the reaction mixture by the air flow. Air was flowed at a rate of 10 liters per hour per 100 cc. of cumene. The temperature was kept at about 100° C. After 5 hours, the cumene hydroperoxide concentration in the reaction mixture was 4.75 weight percent. The reaction was continued, with periodic measurement of cumene hydroperoxide concentrations, for 19 hours. The cumene hydroperoxide concentration at this time was 25 weight percent and was increasing at a constant rate of 1.45 weight percent per hour. The final cumene hydroperoxide concentration represents an overall production rate of 1.3 weight percent per hour. The yield of cumene hydroperoxide, determined iodometrically after distilling off cumene, was 89 percent of theory based on cumene unrecovered. This means a yield of 90-97% of theory when handling losses and systematically low errors of the analytical method are taken into account.

In the preceding example cumene to be oxidized was pretreated by washing with aqueous sodium hydroxide solution. I have found, as disclosed and claimed in my copending application Serial No. 105,647, filed July 19, 1949, now U. S. Patent No. 2,621,213, that treatment of cumene with aqueous sodium hydroxide eliminates or at least greatly reduces the initial induction period, which with some cumene samples amounts to many hours during which although reaction conditions have been established, no appreciable reaction occurs.

*Example 2.*—An untreated cumene sample from the same source as that of Example 1 was oxidized as in Example 1 except that the temperature employed was about 105° C. instead of 100° C. At this more elevated temperature the initial oxidation, even for the untreated cumene, was more rapid than at 100° C.: in the first 5 hours, the cumene hydroperoxide concentration in the reaction mixture reached 5.5 weight percent. The reaction was continued to cumene hydroperoxide concentration of 23 weight percent, reached after 15 hours. At this time cumene hydroperoxide concentration was increasing at a constant rate of 1.8 weight percent in the reaction mixture per hour. The yield of cumene hydroperoxide based on cumene unrecovered, determined as in Example 1, was again 89%.

When still higher temperatures such as 110° C. are used, or when operation is proceeding at cumene hydroperoxide concentrations of say 10 weight percent or more, induction periods are less of a factor than at the start of operations in the above examples. Particularly under such conditions, a quantity of sodium carbonate such as a small fraction of one percent by weight on the reaction mixture, e. g. about $\frac{1}{8}$ of 1%, gives much the same results as those obtainable with larger quantities of soda ash such as about 2%, 5%, or more. Under other conditions these small quantities of sodium carbonate are still usable to advantage but larger quantities may further shorten induction periods.

In the examples the sodium carbonate is in finely divided form and is suspended in the reaction mixture; but it is also possible to operate otherwise, for example by passing cumene and air into a heated tower packed with sodium carbonate pellets.

Suspended sodium carbonate can be separated from cumene oxidation product by settling, then drawing off most of the liquid, or by filtering. Any finely divided powder remaining in the liquid can be removed, if desired, by adding hot water to form a solution of the residual powder and maintaining a temperature of about 90° C. to promote phase separation. The organic phase which separates is free of any substantial quantities of carbonate.

Solid sodium carbonate employed as in the above examples slowly becomes coated with a brown solid and begins to lose its effectiveness. If it is desired to regenerate used carbonate, the coating can be removed by washing first with acetone, then with water. The pure white alkali metal carbonate, thus obtained, after drying shows its original effectiveness in the above oxidation process. Alternatively the sodium carbonate can be regenerated by dissolution in hot water, separation of organic layer, crystallization and drying.

The cumene hydroperoxide product of my process can be recovered as its solution in the reaction mixture; or if desired, it can be recovered in more concentrated form by stripping out cumene from the heated reaction mixture with air or by distilling out cumene at normal pressures or under vacuum, and/or in presence of steam if desired.

If reaction temperatures are too high, yields of cumene hydroperoxide on recovered cumene fall off; and at too low temperatures, below about 90° C., reaction is inconveniently slow and induction periods are frequently encountered. Particularly useful temperatures in my process are between about 100° C. and about 110° C. These temperatures give short or zero induction periods, good reaction rates, and excellent yields, at least up to about 25 weight percent cumene hydroperoxide concentrations in the reaction mixture, as illustrated in the preceding examples. Another advantage of using these temperatures is that any moisture, which would tend to cause sodium carbonate powder to cake and thus interfere with its dispersion, is distilled out of the reaction mixture at these temperatures.

Pressures are suitably about atmospheric. Air flows, dispersion of air and the like have only minor influence on reaction rates and yields once minimal values are exceeded.

Among suitable materials for construction or lining of apparatus employed in my process are stainless steel, aluminum, magnesium, and glass. Each has satisfactory corrosion resistance to my reaction mixtures and is satisfactorily free of undesirable influence on the oxidation reaction.

I claim:

1. In a process for oxidizing cumene to cumene hydroperoxide in liquid phase with elemental oxygen as oxidizing agent, the improvement which comprises providing and maintaining solid sodium carbonate in contact with said cumene and employing temperatures in the range from above 90° C. to about 130° C.

2. Process as defined in claim 1 wherein air is the oxidizing agent and finely divided sodium carbonate in amounts not more than about 25 grams per 100 cc. of unreacted cumene is suspended in the reaction mixture.

3. Process as defined in claim 2 wherein sodium carbonate is separated from reaction products by settling sodium carbonate, withdrawing organic reaction products, dissolving in hot water residual sodium carbonate in said organic reaction products, maintaining temperatures of about 90° C. until phase separation of organic and aqueous phases occurs, and withdrawing organic phase separately from aqueous phase.

4. Process as defined in claim 1 wherein powdered sodium carbonate in amounts between about 0.05 gram and 5 grams per 100 cc. of unreacted cumene is suspended in the reaction mixture, air is the oxidizing agent, and temperatures between about 100° C. and about 110° C. are employed at least until the cumene hydroperoxide concentration reaches about 25% by weight.

5. Process as defined in claim 1 wherein oxidation of the cumene is at temperatures in the range from about 100° C. to about 110° C.

References Cited in the file of this patent

UNITED STATES PATENTS

| Number | Name | Date |
|---|---|---|
| 2,447,794 | Brewer | Aug. 24, 1948 |
| 2,547,938 | Hall et al. | Apr. 10, 1951 |
| 2,548,435 | Lorand et al. | Apr. 10, 1951 |

Disclaimer 2,681,936.—*George G. Joris*, Madison, N.J. SODIUM CARBONATE IN CUMENE OXIDATION. Patent dated June 22, 1954. Disclaimer filed Mar. 10, 1966, by the assignee, *Allied Chemical Corporation*.

Hereby enters this disclaimer to claim 1 of said patent.

[*Official Gazette June 21, 1966.*]